(12) United States Patent
Etievant et al.

(10) Patent No.: US 7,537,623 B2
(45) Date of Patent: May 26, 2009

(54) METHOD AND DEVICE FOR THE PRODUCING OF A GAS RICH IN HYDROGEN BY THERMAL PYROLYSIS OF HYDROCARBONS

(75) Inventors: Claude Etievant, Versailles (FR); Dominique De Lapparent, Paris (FR); Fanny Gaillard, Nozay (FR); Karine Pointet, Frolunda (FR)

(73) Assignee: Compagnie Europeenne des Technologies de l'Hydrogene, Marcoussis (FR)

( * ) Notice: Subject to any disclaimer, the term of this patent is extended or adjusted under 35 U.S.C. 154(b) by 634 days.

(21) Appl. No.: 10/484,251

(22) PCT Filed: Jul. 9, 2002

(86) PCT No.: PCT/FR02/02400

§ 371 (c)(1),
(2), (4) Date: Aug. 14, 2004

(87) PCT Pub. No.: WO03/008328

PCT Pub. Date: Jan. 30, 2003

(65) Prior Publication Data
US 2004/0265223 A1  Dec. 30, 2004

(30) Foreign Application Priority Data
Jul. 17, 2001 (FR) ................... 01 09635

(51) Int. Cl.
*C01B 3/24* (2006.01)
*C01B 3/00* (2006.01)
*C01B 3/02* (2006.01)
*C10J 3/48* (2006.01)
*C10J 3/00* (2006.01)

(52) U.S. Cl. .......... 48/198.1; 48/62 R; 48/61; 48/89; 48/211; 423/648.1; 423/658.2; 422/150; 422/156

(58) Field of Classification Search .......... 48/197 R, 48/198.1, 211, 210, 127.9, 127.1, 62 R, 61, 48/89; 422/150, 156, 188, 198; 208/15, 208/78, 106; 423/648.1, 658.2
See application file for complete search history.

(56) References Cited

U.S. PATENT DOCUMENTS 3,164,487 A * 1/1965 Carley-Macauly et al. ..... 427/6

(Continued)

FOREIGN PATENT DOCUMENTS

DE        1007752 A    6/1971

(Continued)

OTHER PUBLICATIONS

Poirier, M. G., "Catalytic Decomposition of Natural Gas to Hydrogen for Fuel Cell Applications", Int'l. J. Hydrogen Energy, vol. 22, No. 4, pp. 429-433, 1997.

(Continued)

*Primary Examiner*—Walter D Griffin
*Assistant Examiner*—Huy-Tram Nguyen
(74) *Attorney, Agent, or Firm*—Browdy and Neimark, P.L.L.C.

(57) ABSTRACT

The invention concerns a method for producing a gas rich in hydrogen by thermal pyrolysis of hydrocarbons which consists in carrying out, in a reactor (R) a catalyst-free thermal cracking to pyrolyze a fuel selected so as to produce either a gas rich in hydrogen and free of carbon monoxide, or a gas rich in hydrogen and containing carbon monoxide and in using said gas effluents during pyrolysis and inert with respect to the cell as fuel at the burner (B) to heat the reactor so as to bring it to a reaction temperature, and which consists, subsequently, in burning the powder carbon produced in the reactor (R) during the pyrolysis reaction either to produce carbon monoxide or to produce carbon dioxide. The invention is useful in particular for supplying hydrogen to fuel cells and for producing synthesis gas.

11 Claims, 7 Drawing Sheets

U.S. PATENT DOCUMENTS

| | | | | |
|---|---|---|---|---|
| 3,811,916 A | * | 5/1974 | Russell et al. | 427/213 |
| 3,962,411 A | * | 6/1976 | Setzer et al. | 423/651 |
| 5,275,433 A | * | 1/1994 | Klober et al. | 280/741 |
| 5,427,747 A | * | 6/1995 | Kong et al. | 422/186 |
| 5,556,475 A | * | 9/1996 | Besen et al. | 118/723 MP |
| 6,096,106 A | * | 8/2000 | Ruhl et al. | 48/197 R |
| 6,245,309 B1 | * | 6/2001 | Etievant et al. | 423/248 |
| 6,432,376 B1 | * | 8/2002 | Choudhary et al. | 423/584 |
| 6,447,939 B1 | * | 9/2002 | Iwasaki | 429/9 |
| 6,648,932 B1 | * | 11/2003 | Maton | 48/119 |
| 6,814,940 B1 | * | 11/2004 | Hiltunen et al. | 422/141 |
| 7,371,308 B1 | * | 5/2008 | Hackl et al. | 201/25 |
| 2002/0028171 A1 | * | 3/2002 | Goetsch et al. | 423/237 |

FOREIGN PATENT DOCUMENTS

| | | |
|---|---|---|
| EP | 0559924 A | 8/1993 |
| GB | 1173048 | * 12/1969 |
| GB | 1173048 A | 12/1969 |
| WO | WO 9958614 A | 11/1999 |

OTHER PUBLICATIONS

Shpilrain, E., "Comparative Analysis of Different Natural gas Pyrolysis Methods", International Journal of Hydrogen Energy, vol. 24, pp. 613-624, 1999.

Ledjeff-Hey, K., "Compact Hydrogen Production Systems for Solid Polymer Fuel Cells", Journal of Power Sources, vol. 71, pp. 199-207, 1998.

\* cited by examiner

METHOD AND DEVICE FOR THE PRODUCING OF A GAS RICH IN HYDROGEN BY THERMAL PYROLYSIS OF HYDROCARBONS

BACKGROUND OF THE INVENTION

1. Field of the Invention

The invention involves a method for the pyrolysis of hydrocarbons or oxygenised fuels (alcohol, ETB, MTB, . . . ) for the production of a hydrogen-rich gas and possibly for certain applications of carbon monoxide (CO). In particular, but not exclusively, it applies to the conversion of a fuel into a hydrogen-rich gas for fuel cells either low temperature cells of the proton exchange membrane type (PEM) or high temperature cells or molten carbonate fuel cells (MCFC) or solid oxide fuel cells (SOFC).

The expression <<net calorific value>> or NCV is hereafter defined. The calorific value is defined as the quantity of heat given off by the full combustion of the unit of fuel considered. The net calorific value excludes the heat given off, the water condensation heat remaining in vapour state at the end of combustion.

2. Description of the Prior Art

In general, fuel cells are known to be electrochemical systems directly converting chemical energy into electrical energy. The theoretical yield is very high and the sub-products pollute very little. In addition, originally in space missions, fuel cells have demonstrated their efficacy, reliability and longevity. These qualities confirm the value of fuel cells in the production of portable electricity (several hundred watts to several kilowatts) or permanent or on board electricity (2 kilowatts to 200 kilowatts). Therefore, fuel cells represent a possible alternative to thermal engines in a great many of their uses. They can also be used in the creation of co-generation boilers.

Hydrogen fuel may come from a pressurised or cryogenic tank. However, given the safety problems involved in the storage of hydrogen, it is sensible to obtain it from a fuel (hydrocarbon or alcohol) where the hydrogen is released along when needed.

For this purpose, different chemical reactions may be used: vaporeforming, partial oxidation and pyrolysis. Each of these reactions can be activated thermally and/or by means of a catalyst.

The pyrolysis of hydrocarbons not only releases hydrogen but also carbon and other products with a considerable calorific value. This means that the production of hydrogen by pyrolysis only has a sufficient yield if the energy content of the carbon and other co-products is valorised. This situation differs from that of vaporeforming since this method releases the hydrogen contained in the fuel as well as the hydrogen contained in the water. The same is true of partial oxidation when it is coupled with a shift stage.

The reactions are:

| | |
|---|---|
| Vaporeforming: | $C_3H_8 + 6H_2O \rightarrow 3CO_2 + 10H_2$ |
| Partial oxidation + shift: | $C_3H_8 + 3/2O_2 \rightarrow 3CO + 4H_2$ <br> $CO + H_2O \rightarrow CO_2 + H_2$ (x3) |
| Pyrolysis: | $C_3H_8 + 3/2O_2 + 3H_2O \rightarrow 3CO_2 + 7H_2$ <br> $C_3H_8 \rightarrow 3C + 4H_2$ |

However, the experiments carried out with these different methods show that the formation of non negligible quantities of carbon monoxide is inevitable as soon as the oxygen is introduced either directly or in water vapour form.

Therefore, the reformers using partial oxidation or vaporeforming generally include a high or low temperature <<shift>> unit (CO recycling), a vapour generator and a drying unit to remove excess vapour. The conversion of CO is thereby difficult, expensive and cumbersome.

The invention begins with the finding that pyrolysis can be used to eliminate these stages since it occurs without any source of oxygen thereby preventing the formation of CO. In addition, the partial pressure of hydrogen in the gas formed is comparatively higher than in the other methods given, for example, the absence of nitrogen coming from the air used in partial oxidation.

In order to use the advantages of the method related to the absence of oxygen molecules, the choice fuel is a hydrocarbon (methane, propane, butane) or a blend of hydrocarbons. However, an alcohol may be considered as choice in cases where the production of synthesis gases, mixtures of H2 and CO, is required.

Different methods for the use of pyrolysis reactions of hydrocarbons have been recommended by several authors.

In U.S. Pat. No. 5,899,175, Manikowski et al. recommend a hybrid system consisting of a catalytic pyrolysis reactor producing a hydrogen-rich gas and a blend of fuel residues. The hydrogen-rich gas supplies a fuel cell to produce electricity and the blend of fuel residues is burned in a combustion engine to produce mechanical power.

This method allows for the processing of different liquid fuels derived from petroleum. These fuels may be linear or branched alcanes with at least five carbon atoms as well as all types of commercial fuels such gas, kerosene, . . .

The operating conditions chosen as such that only 20% of the hydrogen contained in the fuel is converted into di-hydrogen form.

Poirier et al. recommend a pyrolysis method producing the catalytic decomposition of natural gas into a hydrogen-rich gas and carbon (M. G. Poirier, C. Sapundzhiev, Catalytic decomposition of natural gas to hydrogen for fuel cell applications, Int. J. Hydrogen Energy, vol. 22, No 4, 1997, 429-433). The authors suggest the use of hydrogen-rich gas to supply a PEM fuel cell. The catalytic bed on which the carbon formed during the pyrolysis reaction is deposited is then regenerated by burning the carbon with air. In order to operate in a steady state in spite of the alternate sequences of pyrolysis and regeneration of the catalytic bed, the authors recommend a concept based on the use of two alternating reactors. The first one operates in pyrolysis conditions to produce a hydrogen-rich gas while the second regenerates the catalytic bed by oxidation of the carbon. The structure of the catalytic bed is organised to leave a sufficient dead volume to allow for the accumulation of a large quantity of carbon.

It should be noted that 45% of the net calorific value (NCV) of the natural gas remains in the carbon. Moreover, the pyrolysis of methane, the main component in natural gas, is endothermic and requires about 12% of the NCV of the natural gas. The authors therefore recommend the use of the energy released by the combustion of the carbon to provide the heat required for the decomposition of the natural gas.

In addition, it is necessary to mention that the catalytic bed produces secondary parasite reactions. In fact, the production of CO is observed during the pyrolysis phase while there is no oxygen supply. This emission probably is due to the partial reduction of oxides present in the catalyst and formed during the regeneration phase.

Now, it we want to supply a PEM fuel cell with the hydrogen-rich gas produced by this system, it is necessary to eliminate the CO since over 10 ppm of CO prevents the operation of the cell, since the anode catalyst made of platinum contained is very sensitive to this pollutant. This purification may be carried out by a catalytic methanation method. A methanation reactor therefore has to be placed upstream from the PEM fuel cell on its hydrogen supply circuit.

A system of propane pyrolysis very similar to that of Poirier et al. was recommended by the German Ledjeff-Hey team. It mainly differs by the type of hydrocarbon processed (K. Ledjeff-Hey, V. Formanski, Th. Kalk, J. Roes; Compact Hydrogen Production Systems for Solid Polymer Fuel Cells, J. Power Sources, 71, 1998, 199-207) (K. Ledjeff-Hey, Th. Kalk, J. Roes; Catalytic cracking of propane for hydrogen production for PEM fuel cells, 1998 Fuel Cell Seminar, Palm Springs, Calif. 1998).

The pyrolysis reactions described above present serious defects and deficiencies.

1) In the energy balances:

In fact, pyrolysis methods reveal an intrinsic difficulty: the net calorific value (NCV) of the hydrogen produced is generally of the same magnitude, or even lower than that of the carbon and other pyrolysis residues. There is a resultant problem in the management and valorisation of the energy available in the carbon and other pryolysis residues. If this problem is not suitably dealt with, the global energy balance of the system can only be very low and therefore unacceptable.

2) In the sources of energy required for pyrolysis:

The heat available to heat and decompose the fuel within the pyrolysis reactor may come from three different sources:

the combustion of the carbon during the regeneration sequence, the combustion of other pyrolysis residues, the combustion of non-burnt gases leaving the fuel cell.

These three combustions take place within different chambers: the oxidation of solid carbon takes place inside the reactor in regeneration phase. The combustion of gas emissions may take place in a combustion chamber. It is therefore necessary to plan for very efficient heat exchange structures to provide the efficacy of the heat transfer between the three reaction chambers: reactor during pyrolysis, reactor during regeneration and burner.

3) In the catalyst:

The use of catalytic beds in the two reactors (pyrolysis and regeneration) raises a great many problems: reduced efficacy and ageing of the catalyst, thermal inertia of the reactor, generation of CO during the pyrolysis phase, cost of the system, . . .

4) In the uses:

The supra systems described were designed for the following applications:

hybrid generation of electricity by means of a fuel cell and mechanical energy by means of a combustion engine (U.S. Pat. No. 5,899,175), generation of electricity in a fuel cell (M. G. Poirier, C. Sapundzhiev, Catalytic decomposition of natural gas to hydrogen for fuel cell applications, Int. J. Hydrogen Energy, vol. 22, N° 4, 1997, 429-433), (K. Ledjeff-Hey, V. Formanski, Th. Kalk, J. Roes; Compact Hydrogen Production Systems for Solid Polymer Fuel Cells, J. Power Sources, 71, 1998, 199-207), (K. Ledjeff-Hey, Th. Kalk, J. Roes, Catalytic cracking of propane for hydrogen production for PEM fuel cells, 1998 Fuel Cell Seminar, Palm Springs, Calif. 1998).

OBJECT OF THE INVENTION

The object of the invention is to eliminate these disadvantages. For this purpose, it recommends a solution that enables the use of pyrolysis mechanisms for other applications such as:

Pre-reforming for high temperature melted carbonate fuel cells (MCFC) and solid oxide fuel cells (SOFC).

The co-generation of heat and electricity for the home either by coupling with a PEM fuel cell or by coupling with a SOFC fuel cell.

The production of synthesis gas for petrochemistry.

SUMMARY OF THE INVENTION

To achieve these results, it recommends a method for the production of a hydrogen-rich gas that can be used in a fuel cell. This method consists of carrying out thermal cracking in a reactor without catalyst to pyrolyse a fuel chosen so as to produce either a gas rich in hydrogen and free of carbon monoxide or a gas rich in hydrogen containing carbon monoxide. The gasses emitted during the pyrolysis reaction and inert with respect to the cell are used as fuel in the burner to provide the heating of the reactor in order to bring it to the reaction temperature.

Advantageously, the pulverulent carbon produced during the pyrolysis reaction may be burned so as to produce carbon monoxide or CO, at least in part, or to produce carbon dioxide or $CO_2$ (heat) to complete the heating of the reactions and possibly ensure a connected system of heating.

According to another characteristic of the invention, the reactor may include two or more pyrolysis chambers used alternatively. In this case, the chamber not used for the pyrolysis is regenerated by the introduction of air that, at the proper temperature, provokes the combustion of the carbon deposited during the pyrolysis phase.

According to other characteristics of the invention:

The combustion chamber is placed at the core of the reactor or reactors;

The composition and type of blend supplying the burner vary in time;

The triggering of the combustion reactions in the burner takes place by means of a plasma;

Effective heat exchange structures between the burner and the pyrolysis chamber are foreseen;

The catalytic bed is eliminated;

The hydrogen may be extracted and purified by means of a permeable and selective membrane for hydrogen;

The trapping of solid carbon particles in the pyrolysis reactor occurs by means of filters made of refractory materials;

The production of pulverulent carbon becomes an advantage;

The pyrolysis reactions are catalysed by means of a plasma.

The combustion chamber is placed at the centre of the reactor or reactors in order to effectively heat the reactive mixture at high temperature.

The composition and type of mixture supplying the burner vary with time. In fact, the triggering occurs with the fuel used for the pyrolysis. Once pyrolysis begins, the resulting co-products will be recycled to maintain the reaction in the burner. The carbon monoxide produced during the combustion of the pulverulent carbon may also supply the burner.

A device is foreseen to trigger the combustion in the burner by means of a plasma. Other means of production of the plasma are possible. The most simple method consists of the generation of sparks between the electrodes of a spark plug similar to those used in car engines. A system of starting is required during the triggering of the combustion in the burner. This system may be stopped in a stationary state as soon as the temperature of the burner reaches a value enabling the self-ignition of the fuel blend.

Effective structures for heat transfer between the burner and pyrolysis chamber are foreseen. First, it is necessary to ensure excellent heat transfer between the hot gases resulting from the combustion in the burner and the wall of the burner. This transfer is made more effective here by an increase in the contact surface of the metal with the hot gases by means of a metal structure. In particular, but not exclusively, it has the form of small wings, honeycomb or foam. This structure is placed inside the burner and the contact with the inner walls of the latter minimises the thermal resistance at this level.

In addition, the heat transfer between the burner chamber and the reactive gas circulating inside the pyrolysis reactor is optimised by means of a metal structure similar to the previous one, but in contact with the outer wall of the burner.

Several disadvantages have been noted due to the presence of the catalytic bed in the pyrolysis reactor. Work carried out in the laboratory by the applicant demonstrated that, in a great many cases, the use of a catalyst was not required to improve the yield of the reaction. The elimination of the catalytic bed simplifies the system without reducing the efficacy, reduces its cost and minimises the parasite uncontrolled production of CO.

An optional mode for the use of the method consists of extracting the hydrogen from the reactor by means of membranes permeable and selective for hydrogen. In addition to the value of producing very pure hydrogen, this mode increases the yield of the method since the extraction of the hydrogen shifts the chemical balance in the direction of a more complete reaction. Several ways of introducing hydrogen-selective permeable membranes permeable are described in the infra text.

The dehydrogenation reactions considered lead to the production of solid pulverulent carbon. In order to avoid the deposit of carbon in the pipes of the hydrogen circuit and valorise this carbon by oxidation reactions, it is necessary to trap the solid carbon particles by means of a filter placed inside the pyrolysis reactor. The filter consists of a porous refractive material. One possible way to produce this filter is to form a buffer consisting of refractive fibres in, for example, aluminium wool.

The production of pulverulent carbon turns out to be an advantage here. In fact, several options can be considered for its valorisation. For example, it may, in small stations, be collected for use as is in the industry. It may also be oxidised in situ so as to form a source of heat via the production of carbon dioxide or electricity via the production of carbon monoxide.

The production of carbon dioxide occurs through the combustion reaction:

$$C + O_2 \rightarrow CO_2 \quad \Delta H_{298} = -393.51 \text{ kJ}$$

The production of carbon monoxide occurs by controlled oxidation, that is:

$$C + \tfrac{1}{2} O_2 \rightarrow CO \quad \Delta H_{298} = -110.53 \text{ kJ}$$

The CO produced can then be used as a fuel in a SOFC fuel cell, thereby increasing the yield in electricity.

As an option, a plasma generator may be incorporated in the pyrolysis reactor. In fact, the plasma induces very chemically reactive radicals and plays a role similar to that of a catalyst. This effect, in particular, results in the acceleration of the dehydrogenation reactions of different hydrocarbons. Several types of plasma generators can be used for this application, mainly "barrier" discharge and micro-wave discharge generators. Such devices have been described in former patent WO 98/28223.

BRIEF DESCRIPTION OF THE DRAWINGS

Means of production will be described below by way of non limiting examples, with reference to the appended diagrams in which.

DESCRIPTION OF THE PREFERRED EMBODIMENTS

Figure 1:
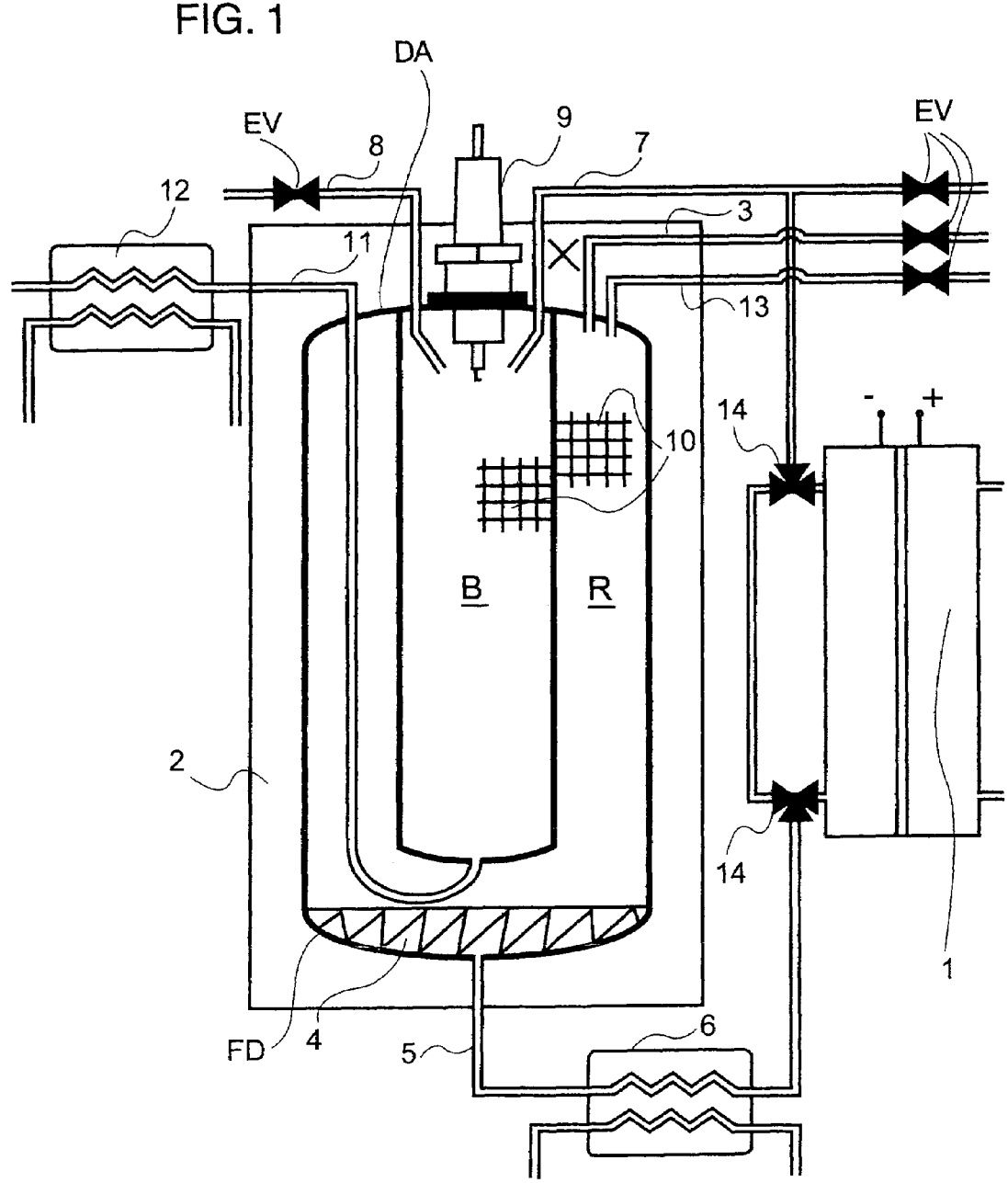
FIG. 1 is a pyrolysis device according to the invention intended for the supply of a low temperature PEM fuel cell.

FIG. 1 represents an example of a pyrolysis device according to the invention. This device here feeds a low temperature PEM fuel cell 1. In its most simple form, this device comprises a single cylindrical reactor R heated by a cylindrical burner B incorporated at the centre so as to provide excellent heat transfer. The reactor-burner unit is placed in a cylindrical heat insulated sheath 2 intended to limit the heat losses of the system. Reactor R is defined by the cylindrical wall of the burner and by an outer cylindrical wall coaxial to the burner. It is enclosed by a spherical cup-shaped bottom FD and by a ring-shaped top DA located around the top of the burner.

In this configuration, the pyrolysis reactor functions cyclically. It is in turn the seat of pyrolysis reactions that produce a hydrogen-rich gas and carbon oxidation reactions that regenerate the reactor.

To supply a PEM fuel cell, it is necessary to avoid introducing CO in the hydrogen-rich gas. As a result, for this application, the pyrolysis of an oxygenised fuel (alcohol, ETB, MTB, . . . ) will be avoided in favour of a hydrocarbon such as methane or propane.

Concerning the pyrolysis phase, reactor R is heated by means of a burner B at a temperature enabling cracking reactions of the hydrocarbon used. This temperature is in the neighbourhood of 550-650° C. for propane and 700-800° C. for methane. The fuel, after eventual desulfonation, is introduced in reactor R through duct 3 located at the top of reactor R. The cracking by pyrolysis creates a hydrogen-rich gas and solid pulverulent carbon that is deposited in reactor R. Filter 4 made of aluminium wool, located at the back of reactor R, retains the carbon particles in the reactor and eliminates them from the hydrogen-rich gas extracted by duct 5 located on the other side of filter 4. Before introduction in the anode compartment of fuel cell 1, the hydrogen-rich gas is cooled by means of heat exchanger 6, at a temperature compatible with this type of cell, or about 50° C.

At the anode compartment outlet, the mixture of gas residues, mainly unburned hydrogen and methane, is recycled towards burner B by means of duct 7.

Burner B is a combustion chamber fed at the top in fuel by duct 7 and in air by duct 8. An additional supply of fuel may be planned to ensure auxiliary heat. The combustion, when the system is cold, is triggered by means of a plasma produced, for example, by an electrical discharge between the electrodes of a combustion engine spark plug 9 located at the top of burner B. When the temperature of burner B becomes high enough, the self-ignition of the combustion occurs and the plasma is no longer necessary.

In order to increase the efficacy of the heat transfer between the hot gases circulating in burner B and the hydrocarbon to crack in pyrolysis chamber R, metal structures 10, for example of the wing, honeycomb or metal foam type are placed from one end to the other of the burner wall.

The hot gases resulting from the combustion in the burner escape through duct 11 located at the back of burner B. The useful heat contained in the exhaust gas is recovered in a heat exchanger 12.

The duration of the pyrolysis sequence is limited by the accumulation of pulverulent carbon in reactor R. This duration varies according to the parameters in the system. It may typically range from 15 to 30 minutes. When reactor R is full of carbon, it is necessary to pass to the regeneration phase.

Concerning the regeneration phase, a simple way to eliminate the carbon accumulated in reactor R consists of oxidising it to form a mixture of CO and $CO_2$. An appropriate and heated flow of air is introduced through heat exchanger 6 at the top of reactor R by means of duct 13. Duct 3 is then closed. The reactions of the carbon with the oxygen in the air are:

$C + O_2 \rightarrow CO_2$ $_{\Delta H_{298}}$=−393.51 kJ

$C + \frac{1}{2} O_2 \rightarrow CO$ $\Delta H_{298}$=−110.53 kJ

$C + CO_2 \rightarrow 2CO$ $\Delta H_{298}$=−172.45 kJ

The $CO + CO_2$ mixture thereby formed is evacuated by duct 5 and led to the burner by duct 7. During this regeneration phase, PEM fuel cell 1 should not receive CO. For this purpose, it is isolated by means of electrovalves 14. It should be noted that electrovalves EV placed on the ducts, controlled by an electric control circuit control the different supplies of gas. The conversion of CO into $CO_2$ is achieved by the combustion of the gases in the burner.

The heat given off is recovered in heat exchanger 6 before admission in burner B and then the excess heat not transmitted through the walls of the burner is recovered by heat exchanger 12 via the exhaust gases.

If we consider the pyrolysis of methane or propane with the device represented in FIG. 1, the ideal reactions are:

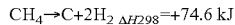
$CH_4 \rightarrow C + 2H_2$ $_{\Delta H_{298}}$=+74.6 kJ

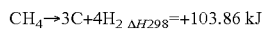
$CH_4 \rightarrow 3C + 4H_2$ $_{\Delta H_{298}}$=+103.86 kJ

The pyrolysis thereby allows for the extraction of a maximum of 2 moles of hydrogen per mole of methane and 4 moles of hydrogen per mole of propane.

As indicated in FIG. 1, the method in the invention, allows for the co-production of heat and electricity from hydrocarbons such as natural gas or propane. The heat is recovered by the two exchangers 6 and 12. Electricity is here produced by a PEM fuel cell 1 that is supplied by the hydrogen derived from pyrolysis.

If the yield of the PEM fuel cell is 50%, this device produces a maximum of 241 kJ of electricity per mole of methane, that is 30% of the NCV of methane. The thermal energy that can be recovered on the exchangers is then 247 kJ. In co-generation, the maximum value of the global NCV yield of the heat+electricity production is therefore 61%. In the case of propane, a production of electricity of 482 kJ is obtained per mole of propane, that is 23.6% of the NCV of propane. The thermal energy that can be recovered on the exchangers will be 1180 kJ per mole of propane. The maximum value of the global NCV yield of the heat+electricity production is therefore 81%. This example is given by way of indication in order to define an order of magnitude of the power produced and the yields.

Figure 2:
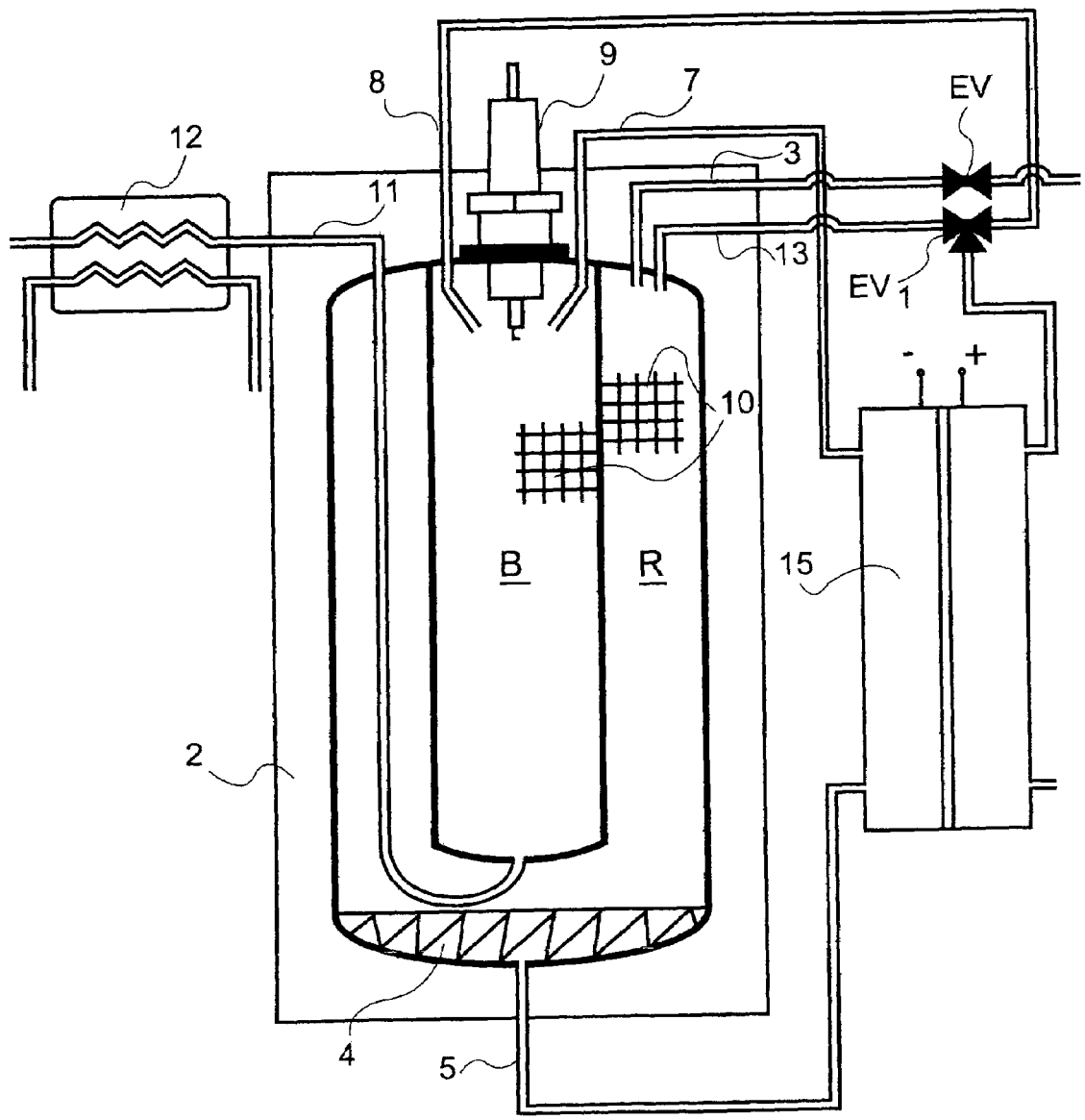
FIG. 2 represents a pyrolysis device according to the invention intended for the supply of a high temperature SOFC fuel cell.

FIG. 2 represents a pyrolysis device according to the invention coupled with a high temperature SOFC fuel cell 15. Its function is then to transform the fuel into synthesis gas (CO+ $H_2$) that is directly useable by fuel cell 15. This conversion upstream from the cell will be called pre-reforming.

It is well known that the conversion yield of SOFC fuel cells is improved when they are supplied with synthesis gas (CO+$H_2$) rather than directly by a hydrocarbon.

Besides the benefit represented by the improved yield, another benefit is related to the length of operation of the SOFC fuel cell. In fact, an attempt to avoid the outer reforming would lead to the introduction of hydrocarbon in the anode compartment of fuel cell 15 and to proceed with the inner vapour-reforming using the water formed at the anode. This very elegant solution however comes up against a major difficulty linked to the deposit of carbon in fuel cell 15. In fact, pyrolysis reactions of the hydrocarbon can not be avoided at working temperatures of SOFC fuel cell. These reactions produce solid carbon that accumulates in fuel cell 15 where it perturbs the operation. In order to avoid this problem, it is advisable to have a pre-reformer upstream from fuel cell 15. In this case, reactor R will play this role. In fact, $H_2$ is produced during the pyrolysis phase and CO during the regeneration phase. The device presents a great many similarities with the case presented above for a PEM fuel cell except for the following points:

Heat exchanger 6 located at outlet 5 is no longer useful since the gases derived from the pyrolyser can be introduced at high temperature in the anode compartment of fuel cell 15.

Electrovalves 14 were eliminated since fuel cell 15 accepts CO and therefore doesn't need to be isolated during the regeneration phase.

The air flow entering the cathode compartment of fuel cell 15 leaves very hot and is recycled in both directions. Electrovalve EV1 leads the hot air to burner B through duct 8 to maintain the combustion, or to reactor R through duct 13 for the regeneration sequence.

The operation of the method during the pyrolysis phase is fairly identical to that described in the example in FIG. 1 when the pyrolyser supplies a PEM fuel cell. However, the following differences are noted:

Fuel cell 15 very well accepts being fed a $H_2$+CO mixture of gases. The constraint to produce a gas rich in hydrogen and fully exempt of CO is no longer required in the present situation. It is therefore possible to expand the choice of fuel to pyrolyse and extend it to ethanol or other oxygenised fuels.

During the pyrolysis phase, a mixture of gas rich in hydrogen is produced with possibly a CO content. This mixture of gas is extracted from reactor R by duct 5 and is directly sent to the anode compartment of fuel cell 15.

The gas emissions of fuel cell 15 leave at high temperature and are directed towards burner B by duct 7 to finish combustion. This combustion is provided by an additional supply of very hot air brought by duct 8 and removed at the outlet of the cathode compartment of fuel cell 15.

During the regeneration phase, as in the case of coupling with a PEM fuel cell, the pulverulent carbon accumulated in reactor R during the pyrolysis sequence should be gasified by oxidation. It should be noted that there is a basic difference here with the case of a PEM fuel cell. In fact, in the present case, the mixture of $CO+CO_2$ gases produced during regeneration in reactor R can be directly sent to the anode compartment of fuel cell 15 via outlet 5. Therefore, due to the conversion of CO in fuel cell 15, an additional contribution to the production of electricity is obtained. To maximise this contribution, the operating parameters during the regeneration phase should be set so that the ratio $\alpha=CO/CO_2$ resulting from the oxidation of carbon is a maximum.

The means to maximise this ratio consist of carrying out gentle combustion of the carbon during the regeneration phase in order to stop the reaction at the formation of CO, that is mainly:
  to reduce the air supply,
  to reduce the temperature of the reactor,
  to inject water vapour into the reactor.

By way of example, a. SOFC fuel cell is considered operating with an electrical conversion efficiency of 45% and is supplied with gases produced during pyrolysis. The reactor is supplied with methane and the pyrolysis reaction produces full conversion of this fuel. With the hydrogen produced, it turns out that this device provides a maximum of 217 kJ of electricity per mole of methane, that is 27% of the NCV of methane.

If the CO produced during the regeneration phase is also converted into electricity, an additional contribution is added to the electric production of a SOFC fuel cell that may reach 127 kJ of electricity per mole of methane, that is 16% of the NCV of methane. The global electric production may thereby in principle reach 344 kJ of electricity per mole of methane, that is 43% of the NCV of methane. The production of heat energy is therefore considerably the same.

A system of co-generation operating with methane according to this principle can then produce a considerably equal electrical power and thermal power with a global efficiency (heat+electricity) of about 80%.

The same system supplied with propane, from the hydrogen formed, may reach an electric production of 434 kJ of electricity per mole of propane, that is 21% of the NCV of propane. The electric production from the CO formed may reach 381 kJ per mole of propane, that is 18.7% of the NCV of propane. The global electric production may thereby in principle reach 815 kJ of electricity per mole of propane, that is 40% of the NCV of propane. Again in this case, the production of thermal energy is considerably equal to the electric production and the global efficiency (heat+electricity) reaches about 80%.

Contrary to most of the results obtained with the solutions known to date, it should be noted that the electrical and thermal power given off are more or less the same.

The performances announced above assume full pyrolysis and regeneration reactions, which is not the case in reality. It therefore consists of maximum values that it is necessary to try to reach in real conditions.

Figure 3:
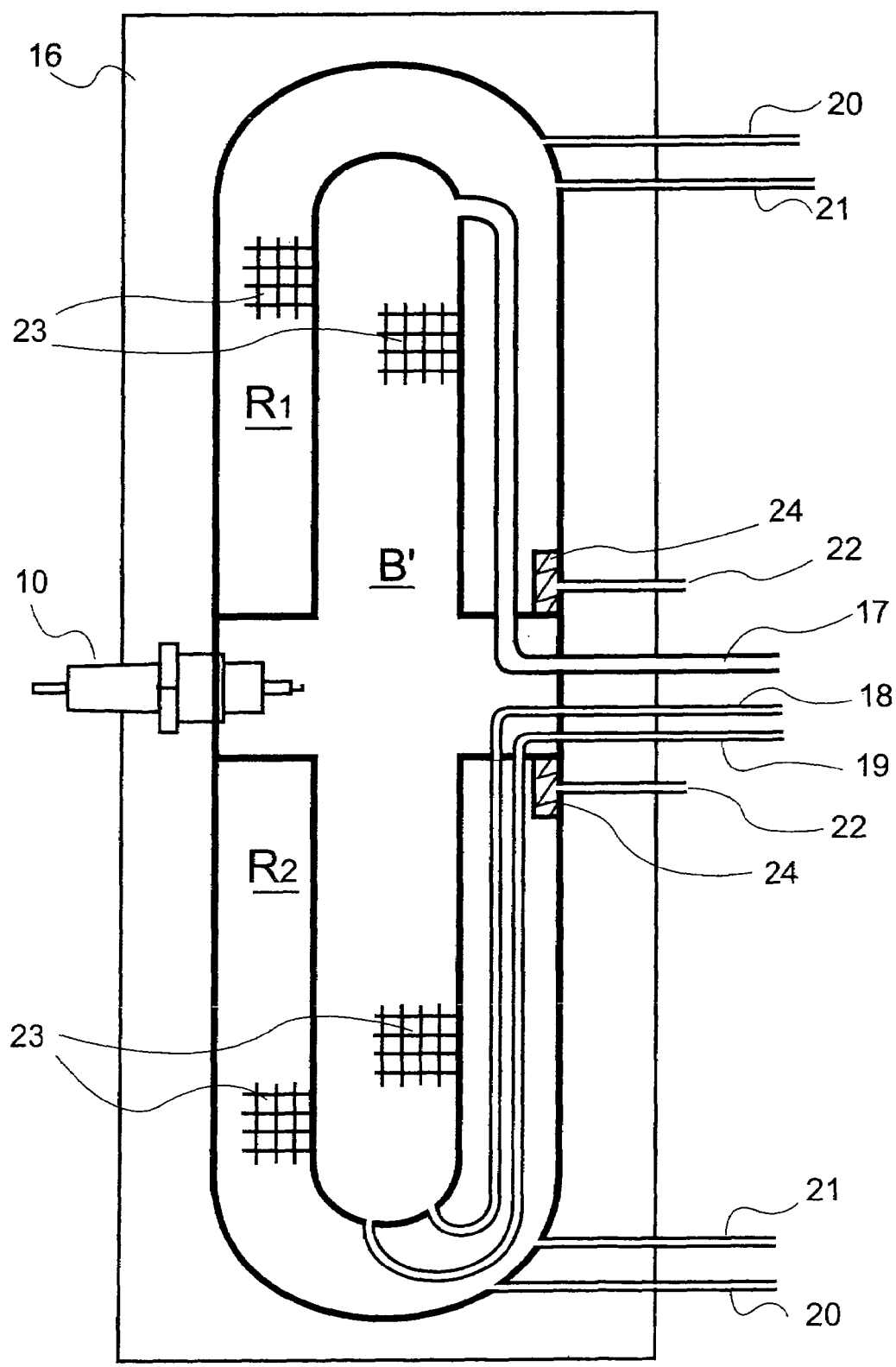
FIG. 3 represents a device including two reactors.

FIG. 3 represents a system with two reactors R1 and R2 to obtain continuous and no longer cyclic operation. The two reactors are defined by an outer cylindrical wall and by the cylindrical walls of burner B'. The reactors, like the burner, are respectively enclosed in a top and bottom in the shape of a spherical cap. The reactor-burner unit is placed in a cylindrical heat-insulated sheath 16 intended to facilitate the maintenance of the pyrolysis reactors at high temperature and reduce the heat losses of the system.

The operating principles of the double pyrolysis chamber device are much the same as those described above in reference to FIGS. 1 and 2. The existence of two reactors helps one operate in pyrolysis sequence while the other operates in regeneration sequence and vice versa. This means that a reactor producing hydrogen-rich gas produced by pyrolysis and a reactor in regeneration sequence providing the oxidation of carbon is constantly available.

In this diagram, we discern:
  Burner B': located at the centre of the system. It is cylindrical and has a shell ring at the centre enabling the enlargement of the combustion chamber. This shell ring helps house ignition device 10 at the middle of the left side of burner B' and the passage of several pipes at the middle of the right side: an evacuation duct 17 collecting the smoke at the top of burner B', a duct 18 supplying the burner with fuel at the bottom and a duct 19 supplying the burner with air also at the bottom.
  A reactor R1 located at the top part of the device and a reactor R2 at the bottom:

The two reactors R1 and R2 are identical. Both are connected to a fuel supply duct 20, an air supply duct 21 and a duct for the evacuation of products 22.

For reactor R1, ducts 20 and 21 are placed at the top of the reactor and duct 22 at the bottom just above the ducts for burner B. For reactor R2, ducts 20 and 21 are placed at the bottom of the reactor and duct 22 at the top, just below the ducts for burner B'.

The transfer of heat between the hot gases (fumes) of burner B' and each reactor is provided by high efficiency heat exchange structures 23 of the same type as those mentioned in the examples of FIGS. 1 and 2.

The carbon particles produced by the pyrolysis reactions are trapped in reactor R1 and in reactor R2 by filters 24 in refractory fibres, for example, in aluminium fibres, located in ducts 22, on each side of the right side of the shell ring.

This double reactor system can be used to constantly supply a PEM fuel cell connected in an analogous manner to the case represented in FIG. 1 or a SOFC fuel cell connected in an analogous manner to the case represented in FIG. 2.

Figure 4:
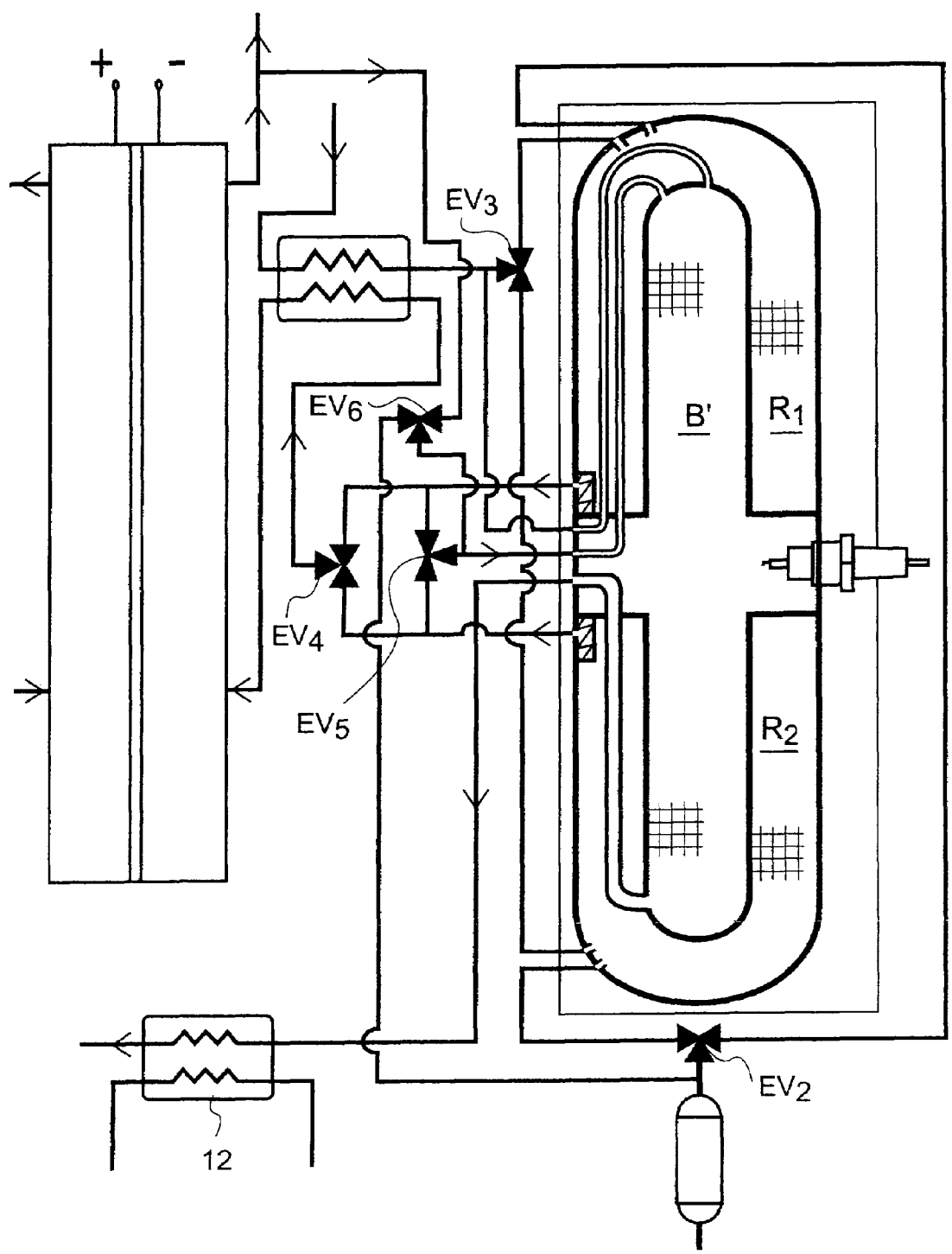
FIG. 4 represents a full circuit incorporating the device in FIG. 3.

FIG. 4 represents a full circuit incorporating the device in FIG. 3. Here, only the gas supply circuits comprising electrovalves controlled by an electrical control circuit will be described.

The supply of pyrolysis chambers (R1, R2) occurs by means of two supply circuits:
  on for the fuel. It comprises a 3 track valve EV2 in turn delivering in both reactors,
  the other for the air. It comprises a 3 track valve EV3 in turn delivering in both reactors and piloted by the control circuit so as to inject air in the reactor that is not supplied with fuel in order to provoke the combustion of pulverulent carbon derived from the pyrolysis reaction carried out during the previous cycle.

Both outlet ducts for the gases from the reactors converge towards a set of two 3 track electrovalves, EV4 and EV5, that can send the gases produced during the pyrolysis and during the partial combustion of the carbon, in the fuel cell for electrovalve EV4 and in the burner for electrovalve EV5.

The burner is supplied in air by the same supply circuit as the pyrolysis chambers but upstream from electrovalve EV3 and in fuel via either electrovalve EV5 as described supra or electrovalve EV6 controlling the choice of gases derived from the fuel cell or the fuel by an engagement upstream from electrovalve EV2.

Figure 5:
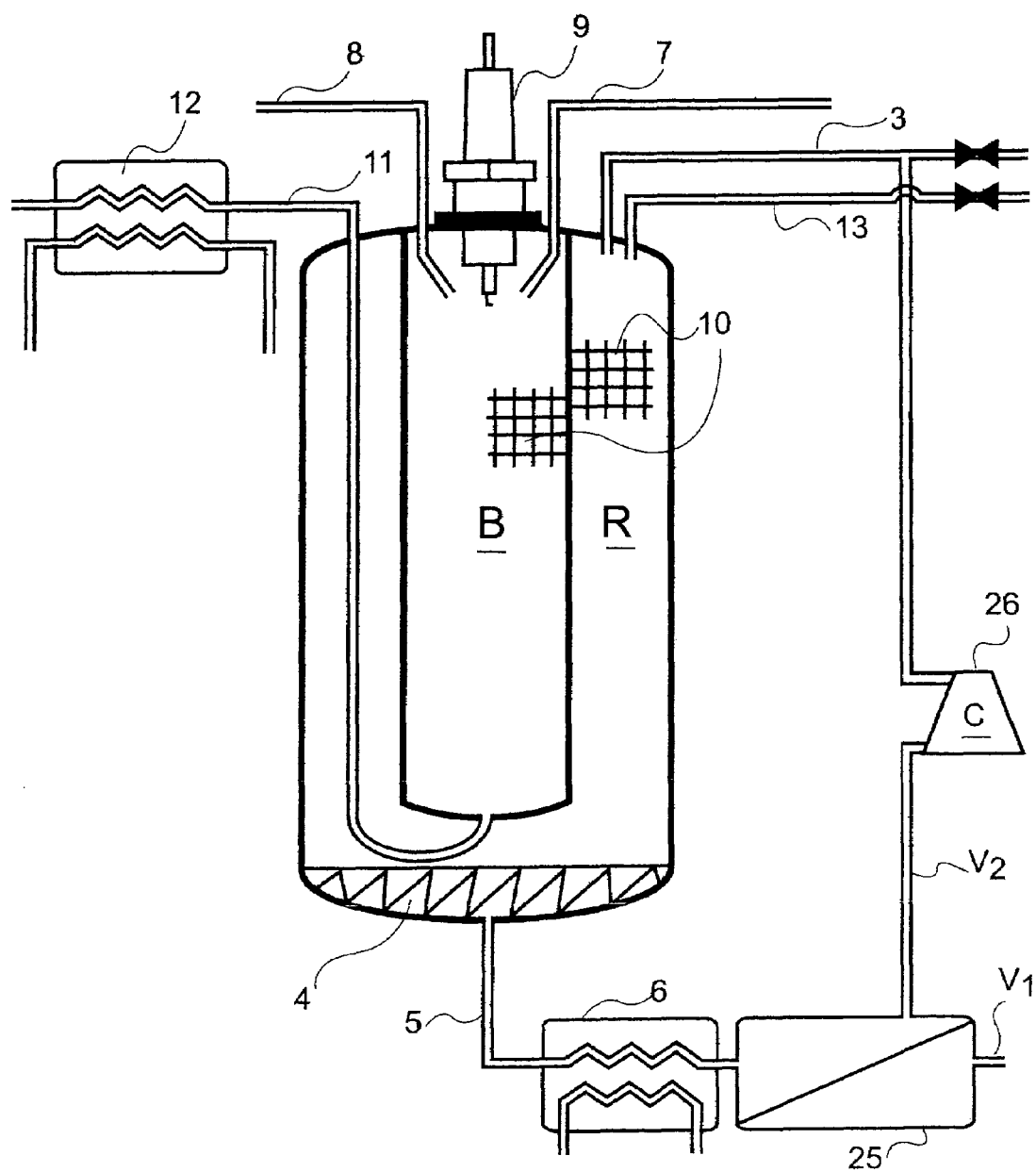
FIG. 5 represents a device using a polymer membrane operating at low temperature intended for the purification of the $H_2$ rich blend obtained.
Figure 6:
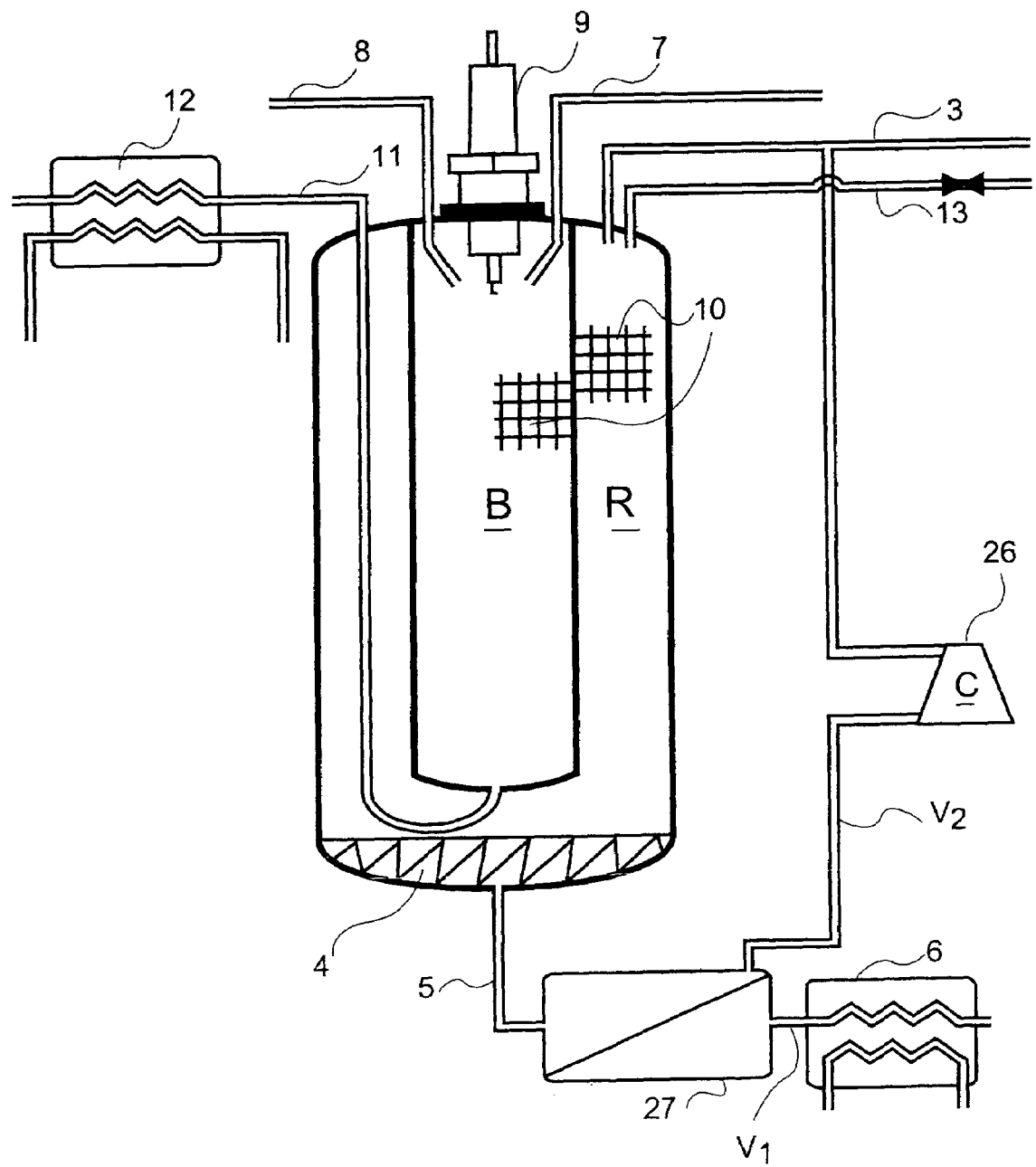
FIG. 6 represents a device using a metal membrane operating at high temperature intended for the purification of the $H_2$ rich blend obtained.
Figure 7:
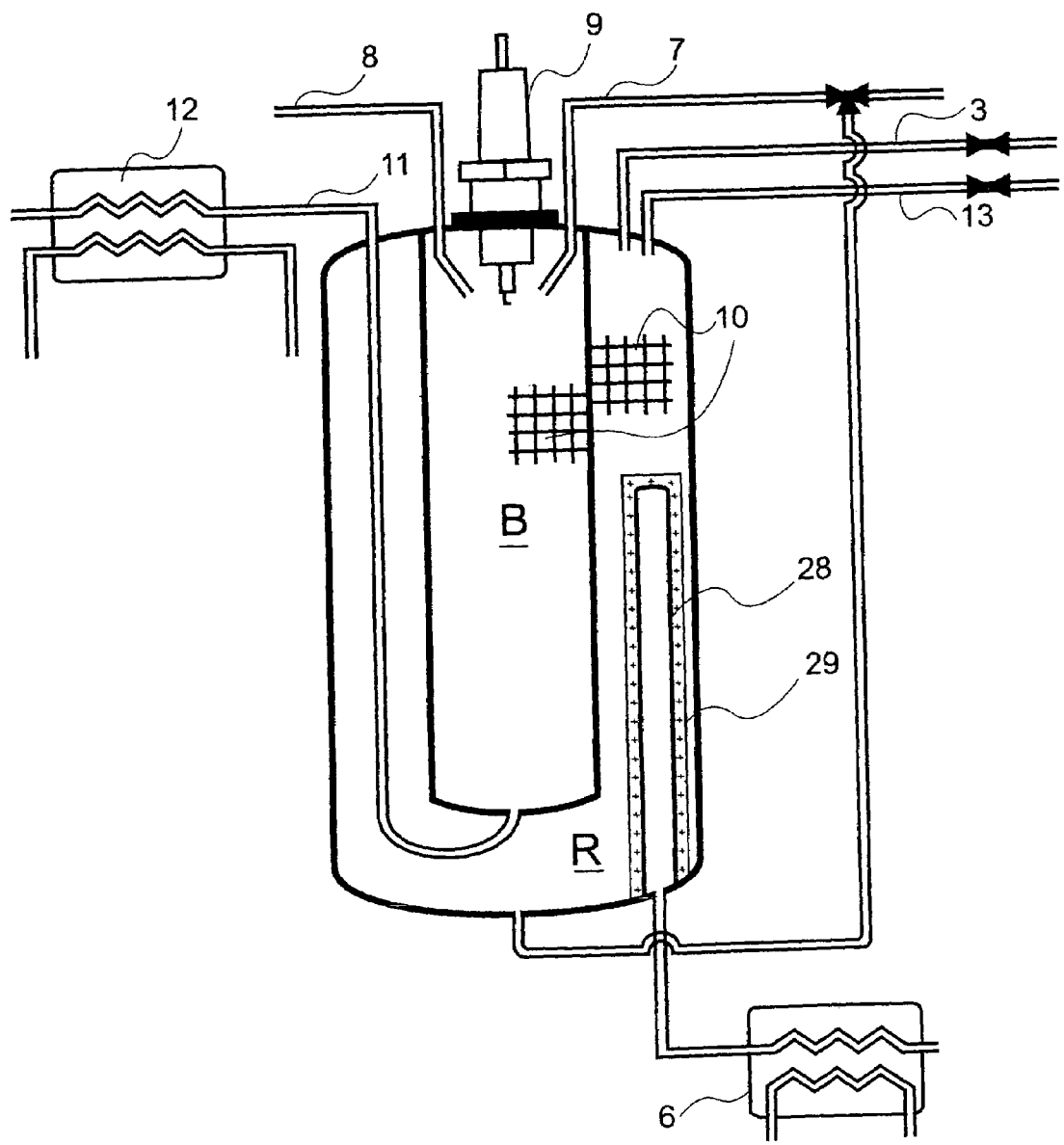
FIG. 7 represents a device characterised by the fact that the metal membrane is placed inside the pyrolysis reactor.

FIGS. 5, 6 and 7 describe a variant of the device, the object of the invention, consisting of incorporating, before the fuel cell, a hydrogen purification membrane in the circuit for the extraction of gases produced by the pyrolysis. The system can thereby be used as a very pure hydrogen generator.

There are two categories of hydrogen permeable membranes that may be used in the system:

polymer membranes. They are very extensively used for the purification of hydrogen in industry. Such membranes only operate at low temperature, less than 120° C., and can therefore only be used outside of the reactor, after the cooling of the hydrogen-rich gas (FIG. 5), metal membranes. They are very selective membranes consisting of a very hydrogen permeable metal, generally an alloy of palladium. These membranes can be used at high temperature, typically 500 to 550° C. They can therefore be integrated either in the high temperature gas circuit (FIG. 6) or in the reactor strictly speaking (FIG. 7).

FIG. 5 represents a device using a polymer membrane 25. The device is similar to that in FIG. 1 except for the following points:

Membrane 25 is sandwiched between heat exchanger 6 and the fuel cell;

The mixture of hydrogen-rich gas extracted from the reactor by duct 5, then cooled at under 120° C. by means of exchanger 6 is sent to the purifier at membrane 25. It leaves by two channels. The first channel V1 carries the very pure hydrogen thereby extracted to the PEM fuel cell in order to supply it and the second channel V2 evacuates the residual gases that are recompressed with a heating compressor 26 so as to be recycled with the fuel supplying the pyrolysis reactor by duct 3.

FIG. 6 represents a device using a metal membrane 27 made of palladium alloy operating at high temperature. This device is similar to that in FIG. 4 except for the fact that membrane purifier 27 is located in front of heat exchanger 6. The very pure hydrogen thereby extracted is sent towards the PEM fuel cell after being cooled by means of heat exchanger 6. The residual gases are recompressed by means of compressor 26 in order to be recycled with the fuel supplying the pyrolysis reactor by duct 3.

FIG. 7 represents a device presenting a metal membrane 28 placed inside the pyrolysis reactor. This membrane made of palladium alloy operates at high temperature, typically at 500-550° C. and has the shape of a cylindrical rod. In order to avoid an accumulation of carbon particles in direct contact with the membrane, the latter is protected by a sleeve 29 of refractory fibres, for example an aluminium fabric. The purpose of this sleeve is to keep the carbon particles away from the membrane.

It should be noted that pyrolysis reactor R can contain, if necessary, several identical membranes so as to increase the active membrane surface and thereby the flow of hydrogen extracted.

It should also be noted that even if a membrane consisting of a cylindrical pencil or a beam of cylindrical rods is one of the possibilities considered, other configurations are also possible. Therefore, membranes in the form of plates or a stack of plates can also be considered.

The main advantage of placing the membrane inside the pyrolysis reactor is the simplicity of the system since compressor 26 and the fuel circulation loop are not required.

The devices represented in FIGS. 5 to 7 can be adapted to the case of the double pyrolysis reactor in FIG. 3. This adaptation does not raise any specific problems.

Among the applications of the method, we can include the production of co-generation boilers (heat and electricity) in the habitat sector as well as recreational vehicles (camping cars, trailers, . . . ). For home applications, for example single family homes, the power level of a co-generation module will be about 5 kWe+5 kWth.

According to the case, the fuels are: natural gas, propane, domestic fuel, . . .

In particular PEM and SOFC fuel cells offer plans adapted to this type of application.

For more powerful installations, such as the urban co-generation for buildings, groups of buildings, hospitals, modules with a power of about 200 kWe+200 kWth have to be developed. Considering the relatively low cost and very developed distribution, natural gas will be the fuel most often used for this application.

Openings in the field of farm applications are also to be considered. For example, farm greenhouses reveal the need for heat and electricity. It should be possible to use ecological fuels such as ethanol for such applications.

An application of the method has a place in the petrochemicals field. In fact, the method is an easy and cheap way to produce synthesis gas ($CO+H_2$) for which there are major uses in the chemistry industry (manufacture of acetic acid, formic acid, acrylic acid, phosgen, isocyannates, . . . ).

The invention claimed is:

1. Device for producing a hydrogen-rich gas that is used in a fuel cell, having a primary circuit comprising an inlet port for receiving said hydrogen rich-gas and an outlet port for extracting a mixture of gas residues non used by said cell, said device comprising:

at least, one reactor of thermal pyrolysis of hydrocarbons having a pyrolysis chamber connected to a first fuel supply circuit and to said inlet port of the fuel cell by an exhaust circuit, at least, one burner sealingly enclosed inside, said pyrolysis chamber, and having a combustion chamber surrounded by said pyrolysis chamber connected to a second fuel supply circuit, to an air supply circuit, and to an escape circuit, said second fuel supply circuit being connected to said outlet port, said device further comprising means for achieving the two following operating modes:

a hydrogen generating mode wherein the combustion chamber is fed with fuel providing from said second fuel supply circuit, air providing from said air supply circuit and said mixture of gas residues and said pyrolysis chamber is fed with fuel providing from said first fuel supply circuit, a regenerating mode wherein the pyrolysis chamber is fed with air providing from an air duct so as to obtain a combustion of solid carbon generated in the hydrogen generating mode and the combustion chamber is fed with fuel providing from said second fuel supply circuit with air providing from said air supply circuit and with a gas mixture providing from the combustion of solid carbon particles in the pyrolysis chamber.

2. Device according to claim 1, wherein the number of reactors is variable and of different forms.

3. Device according to claim 1, wherein reactor is defined by the cylindrical wall of the burner and an outer coaxial cylindrical wall of the burner, reactor being enclosed by a spherical cup-shaped bottom and by a ring-shaped top located around the top of the burner; the reactor-burner unit is placed in a heat insulated sheath.

4. Device according to claim 1, wherein the two reactors are defined by an outer cylinder and by the cylindrical wall of the burner; the reactors as well as the burner are enclosed by a spherical cap-shaped top and bottom; the reactor-burner unit is placed in a heat insulated sheath.

5. Device according to claim 4, wherein burner has a shell ring in the middle.

6. Device according to claim 1, comprising the means to recover the non consumed thermal power.

7. Device according to claim 6, wherein said means are heat exchangers.

8. Device according to claim 1, comprising electrovalves that ensure the management of the different gas flows.

9. Device according to claim 8, wherein said electrovalves are located on the different air and fuel supply ducts.

10. Device according to claim 8, wherein said electrovalves are located on the pyrolysis chamber outlet ducts.

11. Device according to claim 8, wherein said electrovalves are located on the fuel cell inlets.

* * * * *